UNITED STATES PATENT OFFICE.

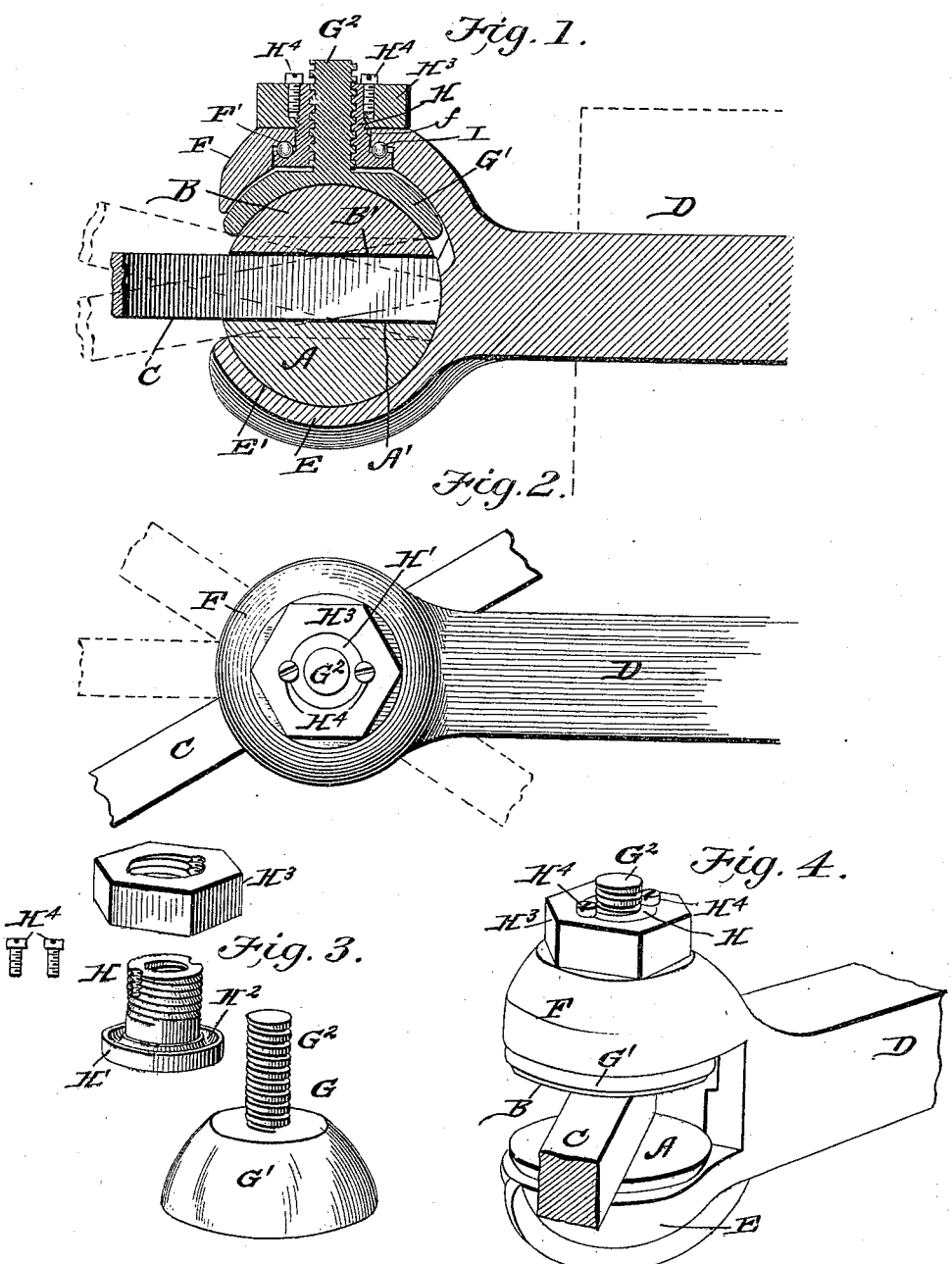

GEORGE R. SHERWOOD, OF KEARNEY, NEBRASKA.

TOOL-HOLDER.

SPECIFICATION forming part of Letters Patent No. 641,241, dated January 9, 1900.

Application filed April 17, 1899. Serial No. 713,357. (No model.)

*To all whom it may concern:*

Be it known that I, GEORGE R. SHERWOOD, residing at Kearney, in the county of Buffalo and State of Nebraska, have made certain new and useful Improvements in Tool-Holders of which the following is a specification.

My invention is an improvement in tool-holders for use on lathes and other machines, and has for an object to provide a simple inexpensive construction which will securely hold the tool and will permit the convenient adjustment thereof to any desired angle or position; and the invention consists in certain novel constructions and combinations of parts, as will be hereinafter described, and pointed out in the claims.

In the drawings, Figure 1 is a vertical longitudinal section, and Fig. 2 is a top plan view, of my tool-holder. Fig. 4 is a perspective view of same, and Fig. 3 shows the clamping devices in detail.

In carrying out my invention I provide a suitable framing and clamping devices in connection with a base-block A and a crown-block B, whose outer surfaces are convex and whose inner surfaces A' and B' are flat, permitting the adjustment of the tool to any angle and the clamping of same between the said block in any desired position. The clamping devices are arranged to bind the blocks A and B together upon the tool C, which latter may be of any desired construction, and the convex form of the outer sides of the said blocks A and B permit the rocking of the same in securing the desired adjustment of the tool.

Manifestly I do not desire to be limited in the broad features of my invention to the specific form of frame or clamping devices shown and presently described; but these specific constructions have especial advantages and are preferred, as will be understood from what follows.

The frame, as shown, has a shank D, which may be secured in any suitable way in the tool-post or other support and is provided at its outer end with the arm E and opposite thereto with the arm F. The arm E has a concave seat E' for the convex outer surface of the base-block A, in which the said block may be tilted to any desired degree.

The arm F is adapted in its under side to receive the concave body G' of the clamp G, which body G' is adapted in its under side to receive the convexed outer surface of the block B. The clamp G also has a screw-shank $G^2$, which projects up through an opening in the top of the arm F, such opening $f$ being also adapted to receive the nut H for adjusting the clamp. This nut H is threaded on the shank $G^2$ and turned within the opening $f$, being provided below said opening and at its lower end with a lateral flange H', which is provided in its upper side with a raceway $H^2$ for the balls I, which form an antifriction-bearing between the flange H' and the wall F' of the arm F, which wall overlies the flange H', as shown. The head $H^3$, secured to the body of the nut H at its upper end and overlying the arm F of the frame, is adapted to receive a wrench, by which the nut may be forcibly turned. In applying the head $H^3$ to the body of the nut the latter is preferably threaded exteriorly to receive the threaded head $H^3$, and the parts are applied as shown in Fig. 1 and locked by the screws $H^4$.

It will be noticed that the clamp G and arm E form concave seats, in which the blocks are loosely fitted and may be adjusted to any desired position. When the tool C is removed, the crown-block B will drop down upon the base-block A and may be removed, if desired, through the space between the opposite arms of the frame, and after the crown-block has been removed the base-block can be lifted and also removed through such space. In applying the blocks A and B the base-block A is first inserted in place and then the crown-block, the base-block being made thicker than the crown-block, as will be understood from Fig. 1. By turning the nut H the clamp G may be caused to exert great pressure upon the crown-block, and in this operation the ball-bearing at I will greatly reduce friction in the operation of the nut. This will permit the clamp to be operated with great force, so that the tool can be securely held in any desired position.

Having thus described my invention, what I claim as new, and desire to secure by Letters Patent, is—

1. A tool-holder comprising the hemispherical base and crown blocks flat on their inner faces whereby they are adapted to receive and permit the lateral adjustment or swinging of the tool and convex on their outer faces, the opposite parts having concave seats for said blocks, and clamping means substantially as set forth.

2. A tool-holder comprising the base and crown blocks hemispherical on their outer faces, the frame having a concave seat for one of the blocks, the concave clamping-plate receiving the other block, and means for operating the clamping-plate substantially as set forth.

3. The frame having an arm provided with a concave seat and an opposite arm provided with an opening for the shank of the clamp, the base and crown blocks convex on their outer sides, the clamping-plate having a concave seat and a shank, and operating devices in connection with such shank for setting the clamp substantially as set forth.

4. A tool-holder comprising the base and crown blocks spherical on their outer faces, the frame having jaws spaced apart and separated at their sides and front, one of such jaws being provided with a seat for one block, and a clamping-plate for the other block arranged in the other jaw, and operating devices for said clamping-plate substantially as set forth.

5. A tool-holder comprising the base and crown blocks convex on their outer surfaces, the frame, the clamping-plate having a concave seat and having a threaded shank, and the operating-nut threaded on said shank and engaged with the framing whereby to operate the clamp substantially as set forth.

6. In an apparatus substantially as described the combination of the convex clamping-block, the frame, the clamping-plate having a threaded shank, and an operating-nut threaded on said shank and having a lateral flange underlying a portion of the frame and arranged to operate the clamp substantially as described.

7. The tool-holder herein described comprising the base and crown blocks convex on their outer surfaces, the frame having an arm provided with a concave seat for one of the blocks and an opposite arm having an opening for the clamping devices, the clamp having a concave plate to fit one of the blocks and a screw-shank, the nut threaded on said shank and having at its inner end a lateral flange underlying a portion of the frame, the balls between said portions, and the head by which to operate the nut all substantially as and for the purposes set forth.

GEORGE R. SHERWOOD.

Witnesses:
E. C. CALKINS,
FRED B. FOX.